US008659974B2

(12) United States Patent
Roberts et al.

(10) Patent No.: US 8,659,974 B2
(45) Date of Patent: Feb. 25, 2014

(54) SYSTEM AND METHOD OF 3D SALT FLANK VSP IMAGING WITH TRANSMITTED WAVES

(75) Inventors: Mark A. Roberts, Houston, TX (US); Brian E. Hornby, Katy, TX (US)

(73) Assignee: BP Corporation North America Inc., Houston, TX (US)

(*) Notice: Subject to any disclaimer, the term of this patent is extended or adjusted under 35 U.S.C. 154(b) by 301 days.

(21) Appl. No.: 13/049,678

(22) Filed: Mar. 16, 2011

(65) Prior Publication Data
US 2011/0228638 A1 Sep. 22, 2011

Related U.S. Application Data

(60) Provisional application No. 61/314,458, filed on Mar. 16, 2010.

(51) Int. Cl.
*G01V 1/28* (2006.01)

(52) U.S. Cl.
USPC .............................. 367/57; 367/73

(58) Field of Classification Search
USPC .......................... 367/57, 73; 702/14
See application file for complete search history.

(56) References Cited

U.S. PATENT DOCUMENTS

| 4,881,207 A * | 11/1989 | Dubesset et al. ............... 367/31 |
| 4,953,142 A * | 8/1990 | Rimmer ........................... 367/73 |
| 5,200,928 A * | 4/1993 | MaCleod ........................ 367/27 |
| 7,400,553 B1 | 7/2008 | Jin et al. |
| 2008/0106971 A1* | 5/2008 | Wang et al. ....................... 367/21 |
| 2009/0303834 A1* | 12/2009 | Sengupta et al. ................ 367/73 |

FOREIGN PATENT DOCUMENTS

| WO | 2008/095289 A1 | 8/2008 |
| WO | 2009/092025 A2 | 7/2009 |

OTHER PUBLICATIONS

Lu et al., "Imaging dipping sediments at a salt dome flank—VSP seismic interferometry and reverse-time migration", SEG/New Orleans 2006 Annual Meeting, pp. 2191-2195.*
Ozdogan Yilmaz, "Seismic Data Processing", Society of Exploration of Geophysicists, 1987, Chapter 1, pp. 9-80, Tulsa, Oklahoma, USA.
Ozdogan Yilmaz, "Seismic Data Processing", Society of Exploration of Geophysicists, 1987, Chapter 6, pp. 384-427, Tulsa, Oklahoma, USA.
International Search Report published for International application No. PCT/US2011/028693, mailed on Jun. 12, 2012, 5 pages.
Mark A. Roberts et al.: "3D Salt-Flank Imaging With Transmitted Arrival VSP Data", SEG Houston 2009 International Exposition and Annual Meeting, 2009, pp. 4129-4133, XP002674959.
Paul A. Farmer et al.: "Application Of Reverse Time Migration to Complex Imaging Problem". First Break, vol. 24, 2006, pp. 1-12, XP002674960.

* cited by examiner

*Primary Examiner* — Ian Lobo
(74) *Attorney, Agent, or Firm* — Gunnar Heinisch (57) ABSTRACT

According to a preferred aspect of the instant invention, there is provided herein a system and method for imaging complex subsurface geologic structures such as salt dome flanks using VSP data. In the preferred arrangement, a receiver wave field will be downward continued through a salt flood model and a source wave field will be upward continued through a sediment flood model until they "meet" at the subsurface locations of the VSP receivers. The source and receiver wave fields will be cross correlated as an imaging condition at each depth interval.

12 Claims, 4 Drawing Sheets

SYSTEM AND METHOD OF 3D SALT FLANK VSP IMAGING WITH TRANSMITTED WAVES

TECHNICAL FIELD

This application claims the benefit of U.S. Provisional Patent Application Ser. No. 61/314,458 filed on Mar. 16, 2010, and incorporates said provisional application by reference into this disclosure as if fully set out at this point.

This invention relates to the general subject of seismic exploration and, in particular, to methods for estimating seismic and other signals that are representative of the subsurface.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface in a grid pattern. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2D processing and that disclosure is incorporated herein by reference. General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D survey are amenable to viewing in a number of different ways. First, horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume. It should also be noted that a 3D dataset can be thought of as being made up of a 5D data set that has been reduced in dimensionality by stacking it into a 3D image. The dimensions are typically time (or depth "z"), "x" (e.g., North-South), "y" (e.g., East-West), source-receiver offset in the x direction, and source-receiver offset in the y direction. While the examples here may focus on the 2D and 3D cases, the extension of the process to four or five dimensions is straightforward.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

Many variations of the conventional source-receiver arrangement are used in practice, e.g. VSP (vertical seismic profile) surveys, ocean bottom surveys, etc.

For all of its usefulness, seismic data suffer from a variety of problems and shortcomings. In more particular, in areas of complex geology the images produced by even the best seismic survey may fail to accurately image important details of the subsurface.

As a specific example, it is well known that the location of the salt-sediment interface is of great importance to people involved in oil exploration and production in the Gulf of Mexico, and many other regions. In such regions, reservoirs may be formed by the truncation of dipping sediments against the flank of a salt done. As a consequence, being able to recognize and determine the location of such a truncation in a seismic data set is of particular importance and would be used to position boreholes that are to be drilled for exploration and production purposes, estimate reservoir reserves, etc.

Unfortunately, in many cases the target salt flank cannot be readily seen on images that have been formed from surface seismic data (i.e., a from data collected during a conventional surface seismic survey). Further, in those cases where a salt-sediment interface is believed to be visible, there still may be considerable uncertainty in its precise location (horizontally and in depth) due at least in part to the large velocity contrast between salt and sediments. Additionally, differences in anisotropic behavior (the effect of the velocity of propagation of seismic energy being dependent on the direction of propagation) between salt and sediments can result in the apparent location of the interface being offset from its true position in the subsurface.

As a consequence, when boreholes are drilled they are often used to obtain a more precise understanding of the location of the salt-sediment interface. Conventionally, this might be done by conducting a salt proximity survey in the well. Those of ordinary skill in the art will understand that a salt proximity survey is a refraction survey that is conducted by exciting a surface source at a single location that has been chosen to be proximate to the top of a salt dome, and recording the shot at multiple receiver position within the well. Once the velocities corresponding to the first arrivals have been determined (the velocity in salt being much faster than the velocity in the surrounding sediment), ray-tracing might then be used to obtain a profile of the salt flanks relative to the borehole.

While salt proximity surveys provide useful information about the subsurface, that information is limited in its usefulness away from the borehole. For example, the traditional salt proximity provides reasonably good estimates of the salt-sediment interface along a line between the source location and the borehole, but it may provide a poorly constrained solution elsewhere in 3D space, especially for rugous surfaces.

Heretofore, as is well known in the seismic processing and seismic interpretation arts, there has been a need for a method of obtaining better estimates of the location of a salt dome flank within the subsurface. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for imaging complex subsurface geologic structures such as salt dome flanks using VSP data. In the preferred arrangement, a "receiver" wave field will be downward continued through a salt flood model and a "source" wave field will be upward continued through a sediment flood model until the subsurface locations of the VSP receivers is reached. The resulting seismic data will provide a better image of the salt surface than was heretofore possible. Note that "receiver" and "source" have been placed in quotation marks to draw attention to the fact that these wave fields are computed from "shot" gathers that might be different from traditional shot gathers as is explained below. That being said, for purposes of the disclosures that follow "source" and "receiver" wave fields will be referred to as such without quotation marks but with the understanding that they are calculated from data that might be organized differently than would typically be the case.

The instant method preferably utilizes a 3D wave-equation migration algorithm. More particularly, the instant method is preferably used to image subsurface structures such as salt dome flanks using transmitted arrival VSP data. Those of ordinary skill in the art will understand that knowledge of the location and extent of a salt flank can be critical for purposes of resource estimates and optimal well planning. Unfortunately, the traditional salt proximity survey provides a poorly constrained salt-sediment line in 3D space. The instant invention provides a system and method for imaging the full salt surface by utilizing VSP (and preferably long-offset walkaway and 3D) datasets that are frequently acquired for imaging purposes.

According to a preferred embodiment, there is provided herein a method of of exploration for hydrocarbons within a predetermined volume of the earth containing structural and stratigraphic features conducive to the generation, migration, accumulation, or presence of said hydrocarbons that begins by accessing a digital representation of a VSP survey that images at least a portion of the predetermined volume of the earth. Next, a "shot" gather will be read or otherwise accessed from the digital representation of the VSP survey. Note that, for purposes of the instant disclosure, a shot gather comprises a plurality of seismic traces that have been recorded at the same receiver depth. Contained within the seismic data of the shot gather will be representations of a receiver wave field and a source wave field.

A salt flood model will be selected according to methods disclosed herein and this model will be used to downward continue the representation of said receiver wave field through a plurality of down going depths, where the plurality of down going depths extends from at least from a depth proximate the surface of the earth to a depth at least approximately equal to said receiver depth. This operation will produce at least one receiver wave field estimate at each of the plurality of down going depths.

A sediment flood model will be selected and used to upward continue said source wave field over a plurality of up going depths, where the up going depths extend at least from proximate to the same receiver depth to proximate to the surface. This creates a source wave field estimate at each of the plurality of up going depths Next, one of said plurality of down going depths and the receiver wave field estimate associated therewith will be selected. Also, one of the plurality of up going depths that is substantially equal to said selected down going depth will be selected, thereby selecting a source wave field estimate associated therewith.

Next, an imaging condition calculation will be performed using the receiver wave field estimate and the source wave field estimate. This operation will produce an imaged data set. In the preferred embodiment, the imagine condition calculation will be a cross correlation.

These steps will be performed a number of times to produce a corresponding number of imaged data set. The imaged data sets will be accumulated to create an image representative of the subsurface of the earth beneath the survey area. The resulting image will then be used to explore for hydrocarbons within the predetermined volume of the earth.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

Figure 1:
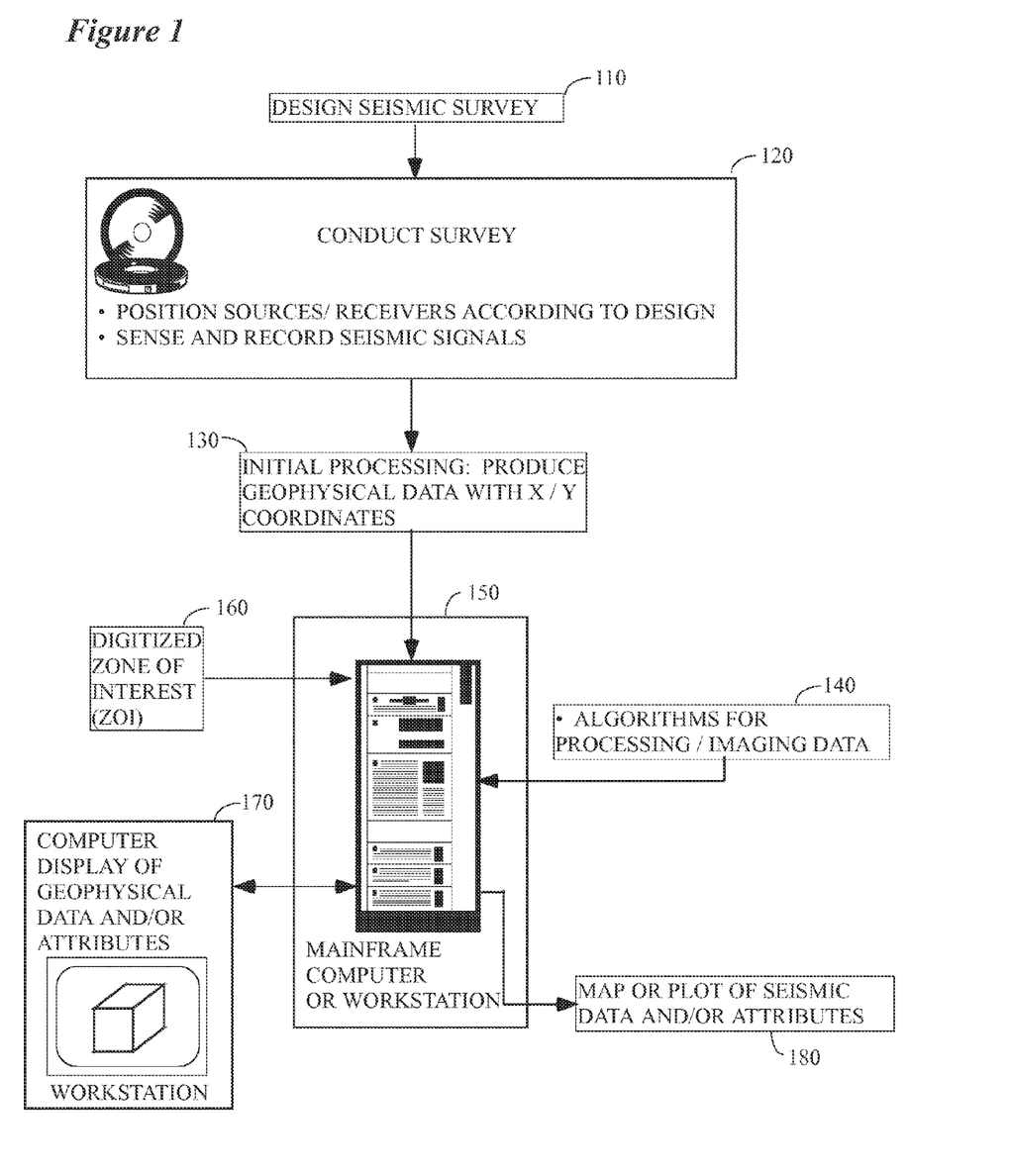
FIG. 1 illustrates the general environment of the instant invention.

FIG. 1 illustrates the general environment in which the instant invention would typically be used. A seismic survey is designed 110 by the explorationist to cover an area of economic interest. Field acquisition parameters (e.g., shot spacing, line spacing, fold, etc.) are typically selected in conjunction with this step, although it is common to modify the ideal design parameters slightly (or substantially) in the field to accommodate the realities of conducting the survey.

Seismic data are collected in the field 120 over a subsurface target of potential economic importance and are typically sent thereafter to a processing center 150 where they will be processed for use in exploration. In some cases, there may be some initial data processing performed in the field and this is becoming more common and feasible given the computing power that is available to field crews.

In the processing center a variety of preparatory processes 130 are applied to the seismic traces to make them ready for use by the methods disclosed hereinafter. The processed traces would then be made available for use by the instant invention and might be stored, by way of example only, on hard disk, magnetic tape, magneto-optical disk, DVD disk, or other mass storage means.

The methods disclosed herein would best be implemented in the form of a computer program 140 that has been loaded onto a general purpose programmable computer 150 where it is accessible by a seismic interpreter or processor. Note that a general purpose digital computer 150 would typically include, in addition to mainframes and workstations, computers that provide for parallel and massively parallel computations, wherein the computational load is distributed between two or more processors. As is also illustrated in FIG. 1, in the preferred arrangement some sort of digitized zone of interest model 160 may be specified by the user and provided as input to the processing A program. In the case of a 3D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

A program 140 embodying the instant invention might be conveyed into the computer that is to execute it by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network. In a typical seismic processing environment, the methods of the instant invention would be made part of a larger package of software modules that is designed to perform many of the processing steps listed in FIG. 2. After processing by the instant methods, the resulting traces would then typically be sorted into gathers, stacked, and displayed either at a high resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

Figure 2:
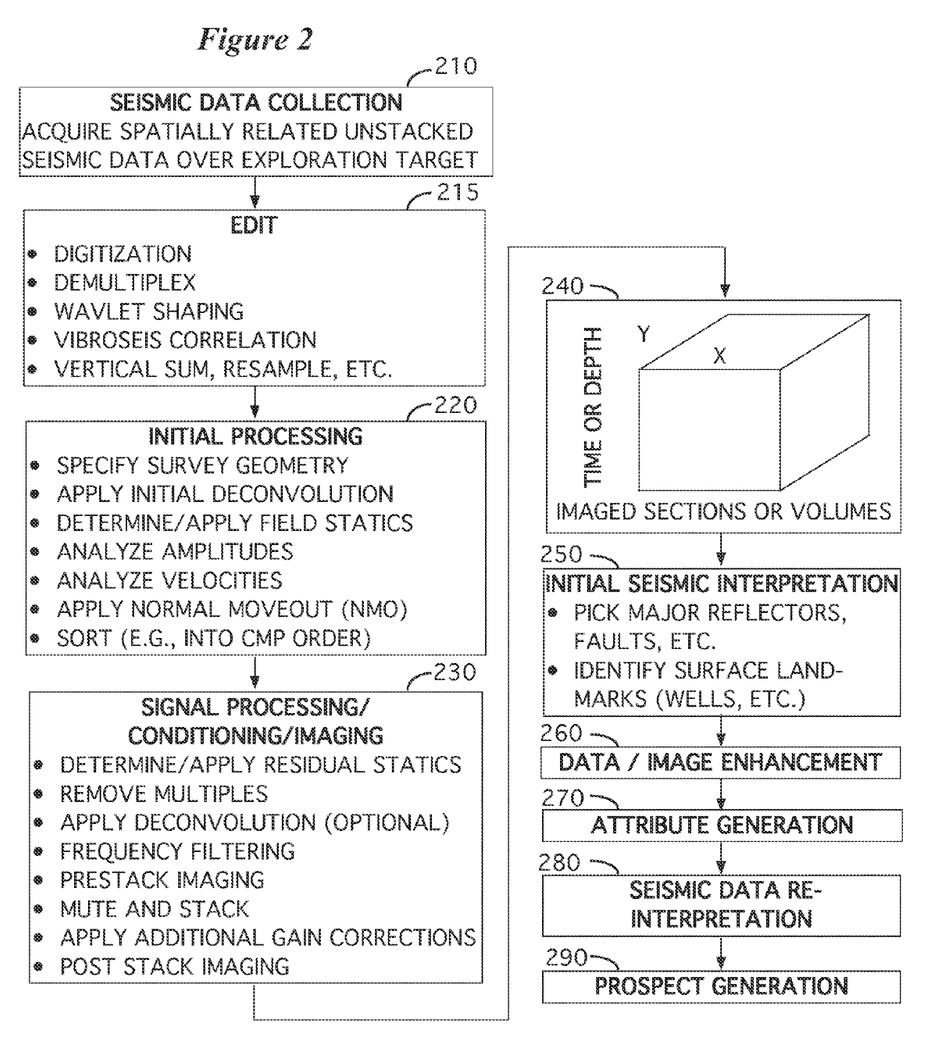
FIG. 2 illustrates a seismic processing sequence suitable for use with the instant invention.

As was indicated previously, the instant invention will preferably be made a part of and incorporated into a conventional seismic processing sequence of the sort generally described in FIG. 2. Those of ordinary skill in the art will recognize that the processing steps illustrated in FIG. 2 are only broadly representative of the sorts of processes that might be applied to such data and the choice and order of the processing steps, and the particular algorithms involved, may vary markedly depending on the individual seismic processor, the signal source (dynamite, vibrator, etc.), the survey location (land, sea, etc.) of the data, the company that processes the data, etc.

As a first step, and as is generally illustrated in FIG. 2, a 2D or 3D seismic survey is conducted over a particular volume of the earth's subsurface (step 210). The data collected in the field consist of unstacked (i.e., unsummed) seismic traces which contain digital information representative of the volume of the earth lying beneath the survey. Methods by which such data are obtained and processed into a form suitable for use by seismic processors and interpreters are well known to those of ordinary skill in the art.

The purpose of a seismic survey is to acquire a collection of spatially related seismic traces over a subsurface target of some potential economic importance. Data that are suitable for analysis by the methods disclosed herein might consist of, for purposes of illustration only, an unstacked 2-D seismic line, an unstacked 2-D seismic line extracted from a 3D seismic survey or, preferably, an unstacked 3D portion of a 3D seismic survey, or a 4D or 5D survey, etc. The invention disclosed herein is most effective when applied to a group of stacked seismic traces that have an underlying spatial relationship with respect to some subsurface geological feature. Again for purposes of illustration only, the discussion that follows will be couched in terms of traces contained within a 3-D survey (stacked or unstacked as the discussion warrants), although any assembled group of spatially related seismic traces could conceivably be used.

After the seismic data are acquired (step 210), they are typically taken to a processing center where some initial or preparatory processing steps are applied to them. As is illustrated in FIG. 2, a common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, it is customary to perform a velocity analysis and apply an NMO (normal move out) correction to correct each trace in time to account for signal arrival time delays caused by offset.

After the initial pre-stack processing is completed, it is customary to condition the seismic signal on the unstacked seismic traces before creating stacked (or summed) data volumes (step 230). In FIG. 2 step 230 contains a typical "Signal Processing/Conditioning/Imaging" processing sequence, but those skilled in the art will recognize that many alternative processes could be used in place of the ones listed in the figure. In any case, the ultimate goal from the standpoint of the explorationist is the production of a stacked seismic volume or, in the case of 2D data, a stacked seismic line for use in the exploration for hydrocarbons within the subsurface of the earth.

In some preferred arrangements, the instant invention might best be utilized in connection with step 230. That being said, those of ordinary skill in the art will recognize that there are many other points in a typical processing sequence that could be improved through the use of the instant invention.

As is further suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from one axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Preferred Embodiments

According to a first preferred embodiment of the instant invention, there is provided a method of imaging seismic data in regions of complex geology, including salt dome boundaries, that utilizes VSP survey information in a way not suggested previously.

According to a preferred aspect of the instant invention, there is provided herein a system and method for imaging complex geologic structures which utilizes a 3D wave-equation migration algorithm through modified subsurface velocity models (i.e., a "salt flood" model and a "sediment flood" model as those terms are used herein). More particularly, the instant method is preferably used to image structures such as salt dome flanks using transmitted arrival VSP data. Those of ordinary skill in the art will understand that knowledge of the location and extent of a salt flank can be critical for purposes of resource estimates and optimal well planning. The salt proximity survey that is traditionally done in wells that are proximate to a salt body provides a poorly constrained salt-sediment line in 3D space. The instant invention provides a system and method for imaging the full salt surface by utilizing VSP (and preferably long-offset walk-away and 3D) datasets that are frequently acquired for imaging purposes.

Note that the term "salt flood model" is used herein to refer to a computerized or other model of the subsurface in which the sediment or other layers that lie beneath a salt body are replaced by artificial rock units that have salt-like physical properties. Said another way, in the preferred embodiment a salt flood model will be created by modifying the properties of the layers beneath the salt that would otherwise be populated with estimates of actual rock (e.g., sandstone, shale, limestone, etc.) velocities and/or densities. These layers will instead be arbitrarily assigned salt velocities/densities.

Similarly, a "sediment flood model" is one where a salt body in the model is effectively replaced by rock velocities that are typical of the layers that surround it. The importance of these models to the operation of the instant invention will be described below.

The rationale behind instant invention may be explained generally as follows. Consider forward propagation of a source wave field though a subsurface medium and cross correlating it at every time with the time reversed receiver wave field as is the case of reverse-time migration. Reverse-time migration provides a very good image of reflector positions, but it also contains low wave number artifacts cause by transmitted arrivals and associated phenomenon. There are many methods to remove these artifacts, such as wave number filters. Such artifacts occur because the two wave fields will have the same phase along the entire path from the source to the receiver. In the case of a salt flank there is typically a large velocity contrast between the salt and the sediments (typically close to a factor of two). Because of the large salt/sediment velocity contrast, the difference in the wave number vectors in the salt and in the sediments will be significant (approximately the same magnitude of the wavenumber of the wavefield propagating in the salt).

Figure 3:
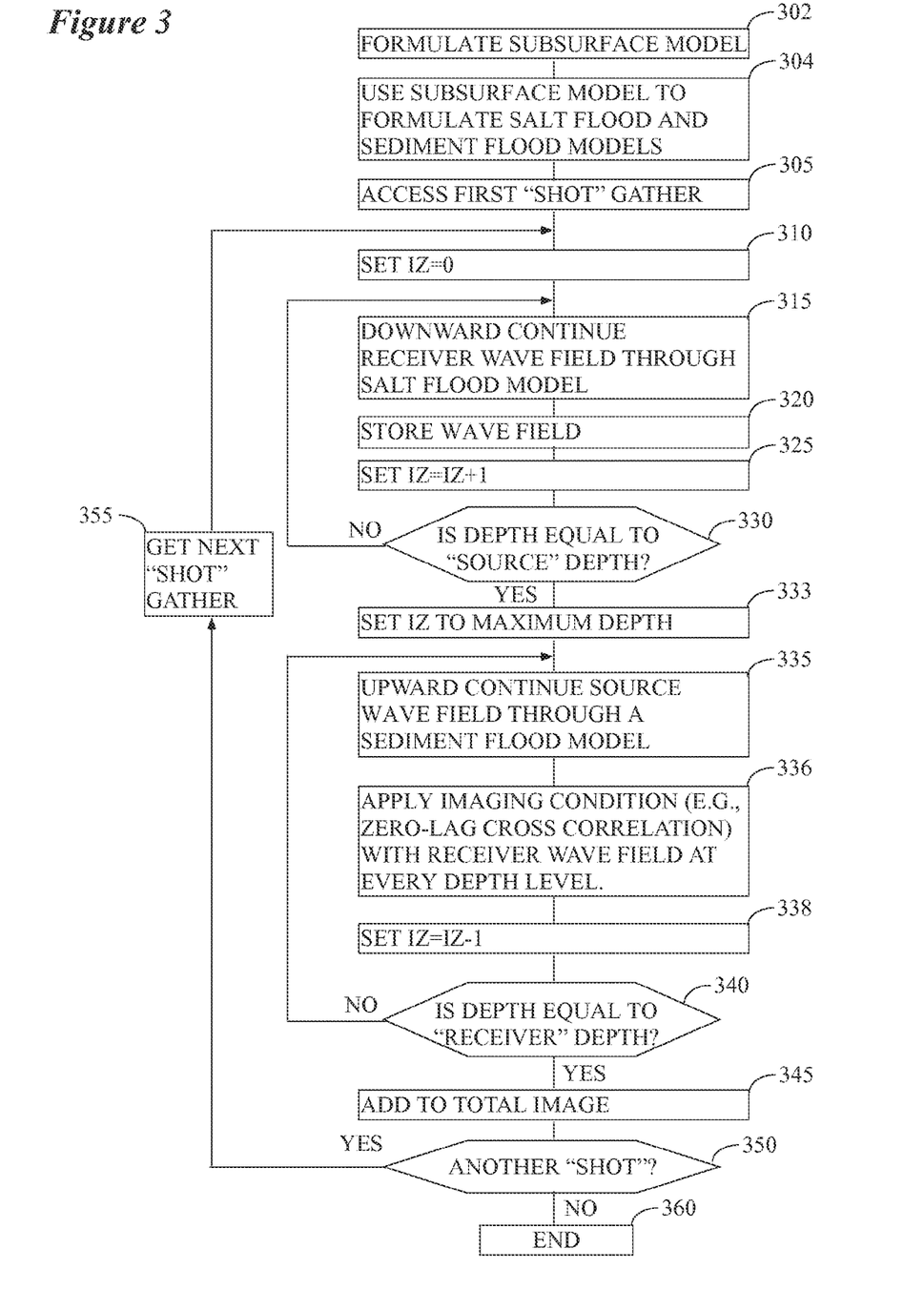
FIG. 3 contains a flow chart of a preferred embodiment of the instant invention.

FIG. 3 contains preferred program logic suitable for use with the preferred embodiment of the instant invention.

As a first preferred step 302, a model of the subsurface as it is believed to exist below the region of interest will be created. Those of ordinary skill in the art will understand how such subsurface models can be and are routinely created in oil exploration and other settings. As has been explained elsewhere herein, preferably the model will contain one or more salt domes, salt bodies, or other structures that have velocities or other seismic properties that are substantially different from those of the surrounding rock units.

Next, modified subsurface models will be created from the model of step 302 by changing the velocities contained therein as described previously. More particularly, preferably a salt flood model and a sediment flood model will be generated (step 304) for use in the algorithm that follows.

Next, and preferably, a "shot" gather will be assembled (step 305) from a VSP or similar seismic survey, where the word "shot" is in quotes for reasons explained elsewhere. Those of ordinary skill in the art will recognize that the step of "assembling" a shot gather need not involve actually reading the traces in question and having all of them in memory at one time. Rather, it is commonplace to "assemble" a gather by identifying where the traces in that gather reside on disk and reading those traces individually as needed.

Note that in a preferred arrangement only 200 ms or so following the onset of the first seismic energy to arrive (i.e., the first breaks) on each trace in the VSP survey will be used in the processing steps that follow. Those of ordinary skill in the art will recognize that the first breaks (direct arrivals) on VSP data tend to contain the down going waves from the seismic source. Further, a 200 ms time window was chosen for purposes of illustration only and those of ordinary skill in the art will be readily able to determine from the seismic data or otherwise a proper time window to use in connection with the instant invention.

Note that the term "shot" has been placed within quotation marks in FIG. 3 and occasionally elsewhere because, for purposes of the instant disclosure, a shot gather should be understood to be a plurality of seismic traces that originate from one or more receivers that are positioned at the same level in the borehole even if these traces actually record different shots. Said another way, a receiver gather is one that has been assembled by assuming that reciprocity applies, i.e., that shots and receivers can be interchanged. Practically speaking, the shot gather that is referred to herein will be a combination of the one or more receivers that have recorded seismic information at the same depth within the well, For example, all seismic traces that were recorded by a receiver that was positioned at 1000 meters in depth would constitute a "shot gather" according to the instant invention. In some cases this might include multiple traces that were recorded by the same physical receiver at the same depth level where, for example, the receiver string was held at the same level while several shots were fired. In other instances, some or all of the shot gather traces might be come from multiple/different physical receivers that were held at the same depth level during different shots. Because a VSP survey is typically collected by lowering a collection of uniformly spaced-apart receivers down into a well, it is not uncommon for multiple receivers to sequentially occupy the same approximate depth (e.g., a 1000 meter string with receivers spaced 100 meters apart might be dropped 500 meters and then the surface shots repeated). Thus, for purposes of the instant disclosure, when a "shot" gather or shot gather (with or without quotes) is referred to herein, in both cases the meaning should be broadly interpreted to include a traditional shot gather (i.e., traces from all of the receivers that recorded the same shot) as well as a collection of traces that have been identified according to the rationale discussed above.

Typically, about 40 or so receivers are used in a downhole array in a VSP. It is customary in these sorts of surveys to lower the receiver string through a series of depth levels in the borehole. At each depth position, many sources will be activated on the surface and recorded. This arrangement will typically produce multiple shots into a receiver at the same depth, which in some cases will be different shots fired into the same receiver at the same depth, and in other cases this may be a succession of different physical receivers that occupy the same depth in the well. Note that, in addition to a conventional VSP survey, walk-away VSPs and 3-D (e.g., spiral) surveys might also be used to acquire data suitable for use with the instant invention. Finally, even check shot surveys might have some use in this regard, although the vertical resolution of such is typically very low (e.g., a check shot survey might collect data every few hundred meters in a well as compared with a VSP which might record information every 25 meters or so). Thus, when the term "VSP survey" is used herein, that term should be broadly construed to cover any instance where the seismic source—whether active or passive—is on the surface and the receivers are located below the surface, or vice versa (e.g., where a down hole source is utilized).

For purposes of conceptual convenience only, when the data are processed, it is preferable that the traces from the VSP survey be thought of as having a shot in the borehole at each receiver location with many receivers on the surface as opposed to the more usual reality of shots on the surface/receivers in the borehole. As has been explained previously, this assumption is valid only if reciprocity applies at least approximately.

As a next preferred step 310, a counter will be set equal to zero, i.e., the starting depth will preferably be at the surface of the earth, to include instances where the surface of the earth is covered by water as would be the case, for example, with an ocean bottom survey. In the example of FIG. 3, the counter "IZ" is a counter will be used to track increments in depth in the loop that follows, i.e., this variable is a surrogate for the current depth in the downward/upward continuation.

Next, and preferably, the receiver wave field will be downward continued through a velocity field that has been modified to represent a salt flood model (step 315). Those of ordinary skill in the art will recognize that a downward continuation utilizes a depth model that might be either 2D or 3D. However, according to the preferred embodiment, the standard (e.g., FIG. 4) subsurface depth/velocity model is replaced as is described below.

Figure 4:
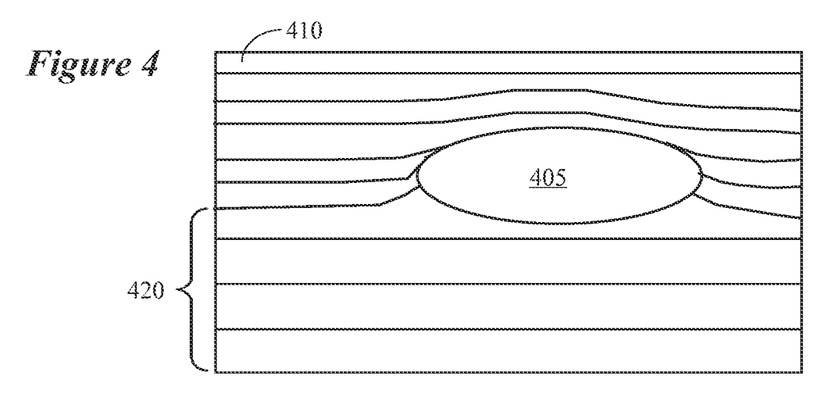
FIG. 4 contains a schematic subsurface structural and velocity model suitable for use with the instant invention.
Figure 5:
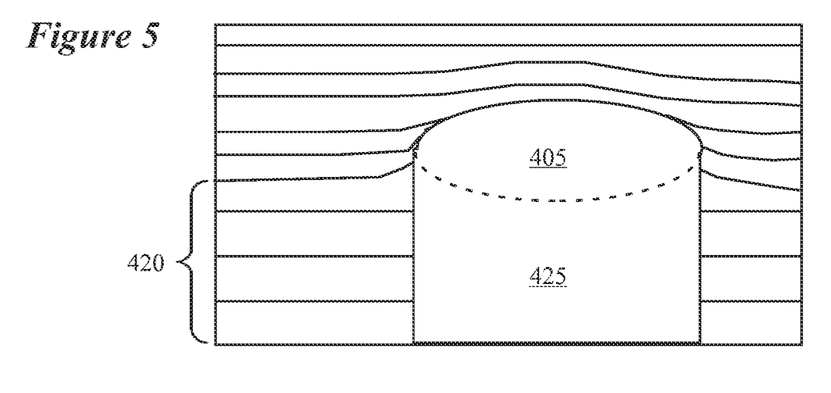
FIG. 5 illustrates how the model of FIG. 4 could be converted to a salt flood model.
Figure 6:
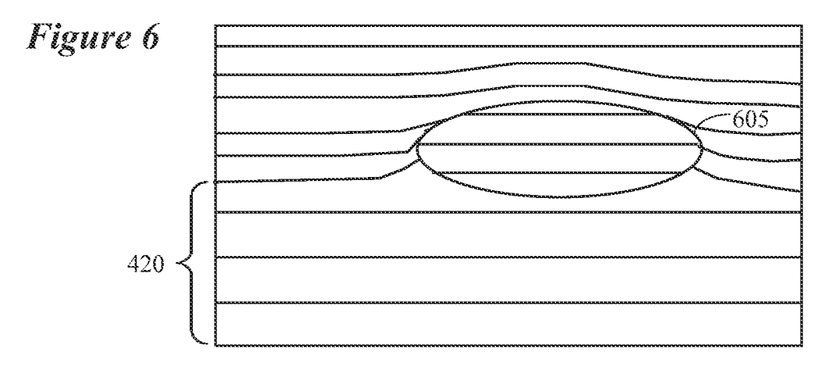
FIG. 6 illustrates how the model of FIG. 4 would appear if converted to a sediment flood model.

FIGS. 4, 5, and 6 contain illustrative subsurface models that explain the operation of the instant invention in greater detail. In a typical salt dome model (e.g., FIG. 4), the upper layer 410 will be water, with the layers beneath the water being comprised of sediments or other rock types down to the point where the salt 405 begins. Assume, for purposes of illustration, that the salt body has a velocity of about 14800 feet per second. Typically, and as is indicated in FIG. 4, beneath the salt will be a series of sediment or other (no-salt) layers 420 having lower velocities. However, in the salt flood model of the instant invention, the layers directly beneath the salt will be arbitrarily assigned velocities equal to that of salt. In FIG. 5, rock layers in the region below the salt 405 (i.e., region 425) have effectively been replaced with a salt mass.

Next, the data will preferably enter a loop wherein the receiver wave field is downward continued though the salt flood model (step 315). The downward continuation is calculated as though the data were acquired at the surface, rather than from within the well via reciprocity. The wave field will be downward continued (steps 315, 320, 325, 330) until the depth is equal to the "source" depth. By this is meant that the wave field is downward continued until the depth of the current "shot" gather is reached (i.e., until the downward continuation reaches the depth of the receiver(s) that gave rise to this "shot" gather).

Next, the counter IZ will preferably set to correspond to a maximum depth in the VSP survey (e.g., a depth equal to IZ times the depth increment in each upward/downward continuation step, assuming that equally sized depth steps are utilized).

As a next preferred step 335, the source wave field will be upward continued through a sediment flood model (e.g., FIG. 6) until the receiver depth is reached. In FIG. 6, the salt body 405 has been replaced by sediment layers 605 that contain velocities that are reflective of the surrounding sediments. In the preferred embodiment, the velocities in the subsalt sediments 420 will be interpolated upward (e.g., to the surface) to create a smoothly varying velocity profile that will be used to replace the salt 405 velocity, or velocities, as the case may be. At each upward continuation step, an imaging condition (e.g., a zero-lag cross correlation) with the receiver wave field will preferably be calculated (step 336). Although cross correlation is the preferred imaging condition, Born scattering, Kirchoff scattering, etc., could also be used in this step. Once again, the variable "IZ" (step 338) has been provided to indicate symbolically the current depth level in the upward continuation algorithm.

The instant invention will preferably continue the upward continuation/cross correlation steps 335 and 336 until the depth is equal to the receiver depth (decision item 340). Note that, according to a preferred aspect of the instant invention, the two wave fields (upward and downward) will correlate at the actual salt flank. Thus, it is not unexpected that this procedure will provide better imaging of the boundary of the salt than has been available heretofore.

Once the source wave field has been upward continued to the receiver depth, (the "yes" branch of decision item 340) the current wave field image will preferably be accumulated (e.g., summed, stacked, stacked with trace weights, combined, etc.) with previous wave fields to produce a composite image. If there is another shot gather to process (the "YES" branch of decision item 350) the program will access the next shot gather (step 355), set the depth indicator to zero (step 310) and repeat the downward/upward continuation of the wave field as has been described previously. Otherwise, the preferred algorithm will end (step 360) and the last total image (step 345) will be used in geophysical exploration for subsurface petroleum or other targets.

The output from the foregoing will preferably be a 3-D volume that images the salt sediment interface. Of course, given the improved image of a salt flank or other geological boundary of the sort provided by the instant invention the explorationist will be better equipped to interpret the configuration of subsurface rock units.

Note that the instant inventors have determined that relatively long offsets are preferred because it is generally desirable to have the seismic signal pass through the salt flank that is to be imaged. That being said, long offsets are not a requirement and the instant invention can potentially work with offsets of any distance.

Although the preferred implementation is purely an acoustic operation based on first arrivals, it is certainly possible that this technique could be extended to computations enabling, for example, the imaging of an interface with energy that has converted from a compressional (P) wave to a shear (S) wave at that interface (or vice versa), e.g., an elastic computation could be utilized. Additionally, with VSP data, it is possible to separate the data into P and S waves via techniques well known to those of ordinary skill in the art (e.g., F-K filtering).

In some preferred embodiments, the down going shear wave field might be used to better advantage than the P wave.

By way of explanation of the foregoing, if a source is situated in a fast medium and the receiver is in a slower medium so that the source wave field is propagated in a constant fast medium and the receiver wave field in a constant slow medium, the two wave fields will not be in phase everywhere. However, the wave fields will be in phase along an isochron that is tangential to the medium boundary at the location where the transmitted energy passed.

In simple cases the isochron will be an oblate ellipsoid. By incorporating multiple sources and/or receivers, the images will constructively interfere along the interface and will deconstructively interfere elsewhere. In concept, this method is most appropriate when used in conjunction with a reverse-time migration algorithm, as this correctly handles wave propagation through complex velocity fields and has no angular limitation. However, as transmission migration is inherently lower resolution than reflection imaging, being associated with the difference in wavenumbers between the two wave fields, it is important to have a method that is sufficiently efficient computationally to allow the migration of higher frequencies (40-50 Hz). As a result, a wave-extrapolation algorithm has been used, based on the Fourier finite-difference method.

Due to the large number of surface source positions and the limited number of borehole receiver positions in a typical VSP survey, the instant invention utilizes the reciprocity theorem. To avoid confusion, the surface wave field, is the receiver data emanating from the source locations, and the borehole wave field, is the source waveform emanating from the borehole receiver location.

Since this method is preferably for use with transmitted data only, a mute will typically be applied around the first arrivals to reduce artifacts from latter arrivals. The conjugate surface wave field will then be downward extrapolated (backward in time) through a salt-flood velocity model (a velocity model that contains the high velocity of salt everywhere beneath the top of the salt). The borehole wave field is upward continued through a velocity model that contains velocities appropriate for sediments everywhere in the model (a sediment flood model).

The Born (or other) imaging condition is then preferably applied to the two wave fields to produce the image. The one-way wavefield extrapolation is dip limited and is unable to propagate energy that approaches the horizontal. However, for long-offset walk-way VSP data the salt flank is typically well illuminated by energy arriving at near horizontal angles.

As a result, for long offset data, a migration in rotated coordinates can be used, whereby the model is rotated to some angle (35° in this case) so that the migration operator can handle horizontally propagating energy in the direction of interest.

Note that recently large 3D look-ahead VSP experiments have been acquired where long arrays of receivers are placed in the borehole beneath the salt. These surveys have been acquired for the purposes of imaging subsalt structures from reflected energy coming from beneath the receivers.

Conclusions

Although the instant invention has been generally described in terms of a salt body surrounded by sedimentary layers, it should be understood that the enclosing layers do not need to be "sedimentary" and could be any rock type (igneous, metamorphic, etc.), although a preferred application is for use with relatively high velocity salt bodies that are situated within relatively low velocity sedimentary layers. Additionally, those of ordinary skill in the art will recognize that the instant invention would be applicable to the imaging of the boundary of any subsurface body that has an anomalous body with respect to the surrounding rock units. As such, when "salt" and "salt velocities" are used herein, those terms should be broadly construed to include any type of subsurface material that has an anomalous velocity with respect to its surroundings. Similarly, when "sediment" or "sedimentary" rocks are mentioned herein, those terms should be understood to refer to the rock units that surround a body with an anomalous velocity, whatever the actual classification of the rock units (e.g., sedimentary, metamorphic, igneous, etc.).

Finally, when it is said, for example, that all of the receivers in a shot gather collect data at the "same" depth, it is actually unlikely that the associated receiver depths will be precisely equal in every case. For any number of reasons the actual depths could possibly vary somewhat from physical receiver to receiver. As such, when it is said that one depth is "the same" as or "equal" to another herein, those terms should be understood to means that the associated quantities are proximate to each other or approximately equal to each other as the case may be.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of exploration for hydrocarbons within a predetermined volume of the earth containing structural and stratigraphic features conducive to the generation, migration, accumulation, or presence of said hydrocarbons, comprising the steps of:
   (a) with a digital computer, accessing a digital representation of a VSP survey that images at least a portion of said predetermined volume of the earth;
   (b) selecting a shot gather from said digital representation of said VSP survey, said shot gather comprising a plurality of seismic traces recorded at a same receiver depth, said plurality of seismic traces together containing at least a representation of a receiver wave field and a representation of a source wave field;
   (c) selecting a salt flood model;
   (d) using said salt flood model to downward continue said representation of said receiver wave field over a plurality of down going depths, said plurality of down going depths extending at least from a depth proximate a surface of the earth to a depth at least approximately equal to said receiver depth, said downward continuation producing at least one receiver wave field estimate at each of said plurality of down going depths;
   (e) selecting a sediment flood model;
   (f) using said sediment flood model to upward continue said source wave field over a plurality of up going depths, said plurality of up going depths extending at least from proximate to said same receiver depth to proximate to the surface, thereby creating a source wave field estimate at each of said plurality of up going depths;
   (g) selecting one of said plurality of down going depths and said receiver wave field estimate associated therewith;
   (h) selecting one of said plurality of up going depths substantially equal to said selected down going depth, thereby selecting a source wave field estimate associated therewith;
   (i) performing an imaging condition calculation using said selected receiver wave field estimate and said selected source wave field estimate, thereby producing an imaged data set;
   (j) performing at least steps (g) through (i) a plurality of times, thereby producing a plurality of imaged data sets;
   (k) accumulating said plurality of imaged data sets, thereby obtaining an image representative of at least a portion of said predetermined portion of the earth; and,
   (l) using said image representative of at least a portion of said predetermined portion of the earth to explore for hydrocarbons within said predetermined volume of the earth.

2. The method according to claim 1, wherein step (i) comprises the step of:
   (i1) performing a cross correlation between said selected receiver wave field estimate and said selected source wave field, thereby producing an imaged data set.

3. The method of exploration for hydrocarbons within a predetermined volume of the earth according to claim 1, wherein step (k) comprises the steps of:
   (k1) accumulating said plurality of imaged data sets, thereby obtaining an image representative of at least a portion of said predetermined portion of the earth, and,
   (k2) writing at least a portion of said image representative of at least a portion of the said predetermined portion of the earth to computer readable medium.

4. A method according to claim 3, wherein said computer readable medium is selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

5. The method according to claim 1, further comprising the step of:
   (m) viewing at least a portion of said image representative of at least a portion of said predetermined portion of the earth on a display device.

6. The method according to claim 1, wherein step (k) comprises the step of:
   (k1) summing together said plurality of imaged data sets, thereby obtaining an image representative of at least a portion of said predetermined portion of the earth.

7. A method of exploration for hydrocarbons within a predetermined volume of the earth containing structural and stratigraphic features conducive to the generation, migration, accumulation, or presence of said hydrocarbons, comprising the steps of:
   (a) within a digital computer, accessing a digital representation of a VSP survey that images at least a portion of said predetermined volume of the earth, said VSP survey comprising a plurality of VSP seismic traces containing data representative of seismic signals recorded at a plurality of different depths within said predetermined volume of the earth;
   (b) selecting a shot gather from among said plurality of VSP seismic traces, said shot gather comprising a plurality of seismic traces containing data representative of seismic signals recorded at a same receiver depth, said plurality of seismic traces together containing at least a representation of a receiver wave field and a representation of a source wave field;
   (c) selecting a salt flood model;
   (d) using said salt flood model to downward continue said representation of said receiver wave field to a plurality of down going depths, said plurality of down going depths extending at least from a depth proximate a surface of the earth to a depth at least approximately equal to said receiver depth, said downward continuation producing at least one receiver wave field estimate at each of said plurality of down going depths;

(e) selecting a sediment flood model;

(f) using said sediment flood model to upward continue said source wave field to a plurality of up going depths, said plurality of up going depths extending at least from proximate to said same receiver depth to proximate to the surface, thereby creating a source wave field estimate at each of said plurality of up going depths;

(g) selecting one of said plurality of down going depths and said receiver wave field estimate associated therewith;

(h) selecting one of said plurality of up going depths substantially equal to said selected down going depth, thereby selecting a source wave field estimate associated therewith;

(i) performing an imaging condition calculation using said selected receiver wave field estimate and said selected source wave field estimate, thereby producing an imaged data set;

(j) performing at least steps (g) through (i) a plurality of times, thereby producing a plurality of imaged data sets;

(k) accumulating said plurality of imaged data sets, thereby obtaining an image representative of at least a portion of said predetermined portion of the earth; and, (l) using said image representative of at least a portion of said predetermined portion of the earth to explore for hydrocarbons within said predetermined volume of the earth.

8. The method according to claim 7, wherein step (i) comprises the step of:
(i1) performing a cross correlation between said selected receiver wave field estimate and said selected source wave field estimate, thereby producing an imaged data set.

9. The method according to claim 7, wherein step (k) comprises the steps of
(k1) accumulating said plurality of imaged data sets, thereby obtaining an image representative of at least a portion of said predetermined portion of the earth, and,
(k2) writing at least a portion of said image representative of at least a portion of the said predetermined portion of the earth to a computer readable medium.

10. The method according to claim 9, wherein said computer readable medium is selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

11. The method according to claim 7, further comprising the step of:
(m) viewing at least a portion of said image representative of at least a portion of said predetermined portion of the earth on a display device.

12. The method according to claim 7, wherein step (k) comprises the step of:
(k1) summing together said plurality of imaged data sets, thereby obtaining an image representative of at least a portion of said predetermined portion of the earth.

* * * * *